L. W. BUGBEE.
OPHTHALMIC MOUNTING.
APPLICATION FILED NOV. 12, 1917.
1,340,875.
Patented May 25, 1920.
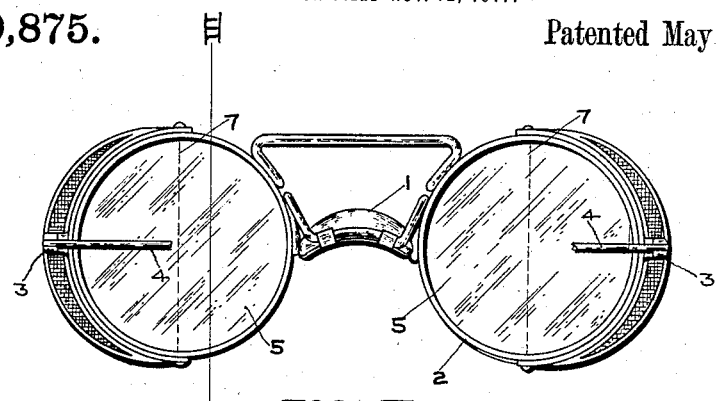
FIG. I
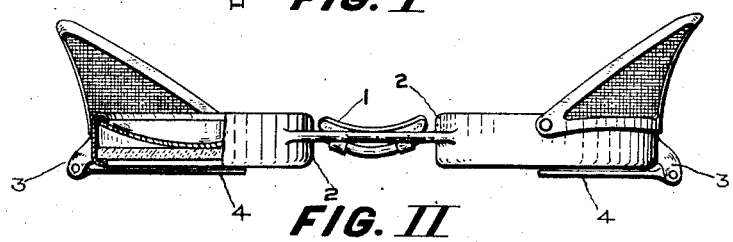
FIG. II
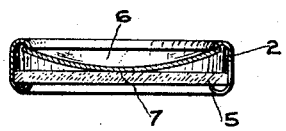
FIG. III
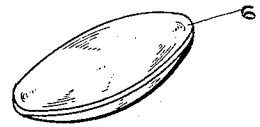
FIG. V
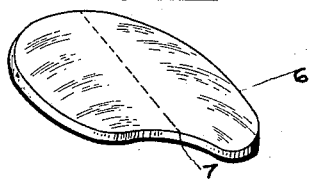
FIG. IV
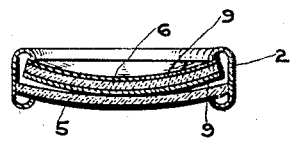
FIG. VI
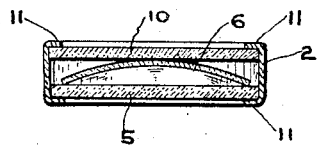
FIG. VII
INVENTOR
LUCIAN W. BUGBEE
BY
H. H. Styll & H. H. Parsons
ATTORNEYS ism of the same. This resilient member 6 is preferably formed to substantially fit within the contour of the frame 2, as shown in the drawings, so that its edges contact with the rear of the frame 2 as illustrated in Fig. III.

UNITED STATES PATENT OFFICE.

LUCIAN W. BUGBEE, OF SOUTHBRIDGE, MASSACHUSETTS, ASSIGNOR TO AMERICAN OPTICAL COMPANY, A VOLUNTARY ASSOCIATION OF MASSACHUSETTS.

OPHTHALMIC MOUNTING.

1,340,875.  Specification of Letters Patent.  Patented May 25, 1920.

Application filed November 12, 1917. Serial No. 201,500.

*To all whom it may concern:*

Be it known that I, LUCIAN W. BUGBEE, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to an improved construction of mounting suitable for use with corrected lenses or the like, which shall at the same time afford adequate and satisfactory protection to the eye of the wearer.

A further object of the present invention is the provision of an improved form of mounting for a spectacle or other lens which will satisfactorily retain the lens in position before the eye but permit of the lens yielding to lessen the liability of breakage upon a blow thereagainst.

Another object of the invention is the provision in connection with a structure of the character just described of improved means for preventing flying particles from entering the eye.

A further object of the invention is the provision of an improved construction which will afford protection not only from flying particles but undesirable light or other radiations.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a spectacle mounting embodying my invention.

Fig. II represents a plan view thereof.

Fig. III represents a sectional view taken as on the line III—III of Fig. I.

Fig. IV represents a perspective view of one form of lens bracing member.

Fig. V represents a similar view of another form of lens bracing member.

Fig. VI represents a view similar to Fig. III of a slightly varied form of my invention.

Fig. VII is a transverse sectional view illustrating another modified form of the invention.

In the drawings, in which similar characters of reference are employed to denote corresponding parts throughout the several views, the numeral 1 designates the bridge bearing at its end a frame member 2 provided with the usual end pieces 3 and temples 4 or the like for retaining the mounting in position on the face of the wearer.

Mounted within the frame 2 are the lenses 5, which may be either of plain glass or preferably ground with the wearer's prescription to correct defects in the vision of the wearer. My invention, however, relates not to the particular kind of lens here employed so much as to the manner of supporting this lens in position, although it will be understood that my invention is particularly advantageous for use in connection with lenses for correction of the vision of the wearer, since it tends to prevent or reduce to a minimum the liability of breakage of the lens in question and also allows the wearer to have his vision properly corrected and get the eye rendered safe from flying particles or the like without the very great expense of obtaining this result with specially constructed protection lenses.

In the carrying out of this invention as illustrated in connection with Fig. III, I make use of my improved lens bracing and retaining protection member 6 in the form of a section of a cylinder having a transverse curve so that the center portion approximately along a line passing through 7 will contact with the lens 5, while the terminal edges curve rearwardly away therefrom into engagement with the rear of the frame 2, as shown in Fig. III. This member 6 is preferably formed from celluloid, a bakelite composition or other similar material having the properties of transparency and of inherent flexibility or resiliency and of resistance to breakage.

By reference to Fig. III it should, therefore, be understood that the lens 5 is placed within the frame and the resilient transparent spring member 6 placed therebehind contacting as for example along the line 7 indicated by dotting in connection with Fig. I, and that consequently the lens may spring backward or yield somewhat upon a blow thereagainst due to the resiliency and flexibility of the member 6, lessening the liability of breakage of the lens itself, while the member 6 therebehind will serve to take up the force of the blow and prevent the fragments of glass being driven back into the eye in the event that the lens 5 itself becomes shattered.

In Figs. V and VI, I have illustrated a slightly different form of my invention, in which the member 6 is constructed as of concaval convex spherical form in place of cylindrical form, in which event it will contact with the lens only at a limited area about the point 7 and will curve rearwardly free from the lens to engage the frame and form a spring arch holding the lens forward in the frame, as in the form just described.

In addition, however, to serving as a spring arch support for the lenses, the member 6 preferably has certain extremely desirable properties of its own, in that it may be formed from a material having the inert property of elimination as by absorption, reflection or the like of certain of the waves of either visible or invisible spectrum, thus producing desired protection for the eye of the wearer both from flying particles of the lens and also producing in connection with the lens the effect of a colored glass, while saving the wearer the expense and difficulty of obtaining his prescription ground in the color or tint of glass desired for a particular purpose.

I may if desired, as most clearly illustrated in connection with Fig. VI, form on either one or both faces of the member 7 the supplemental film or deposit 9 of suitable metal or other composition. For example, as shown in this figure, the film 9 may be disposed on the front face of the member 6 and have the property of reflection of heat rays, protecting the eye of the wearer from excessive heat.

A mounting embodying my improvement and so constructed will, therefore, have first, correction for the visual defects of the wearer embodied in the member 5; protection to the eye physically through the member 6, and the protection from chemical or other action on the eye through the presence of the film 9.

In addition this film 9 will, of course, serve to reinforce and protect the member 6 itself.

A particularly desirable form for this purpose has been shown in connection with Fig. VI, in which a film 9 has been placed on the front surface of the member 6 adapted to reflect heat rays or the like and a second film 9 has been placed on the back surface, this second film preferably being formed by a deposit of silicon or other hard material not readily scratched or injured, thus serving to protect the rear face of the member 6 against accidental injury, while if desired this member may also have the property of elimination of the ultra violet or chemical rays of the invisible spectrum or of any desired rays in the visible spectrum.

From the foregoing description the construction and advantages of my improved visual members for use in connection with an ophthalmic mounting will be readily understood and it will be noted that I have provided a combination visual member in which an ordinary correction lens may be readily mounted, in which this lens is yieldingly held in position by a bracing or reinforcing member which will permit of yielding of the lens to minimize liability of breakage thereof in case of shocks caused either by blows thereagainst or dropping of the mounting itself, and which will present a tough relatively non-frangible backing for the lens to protect the eye of the wearer in the event that the lens is broken while on the face, and which will in addition embody in this embracing and reinforcing member certain light filtration means for selectively eliminating from the transmitted light desired rays of the visible or invisible portions of the spectrum.

Attention is invited to the fact that in Fig. III the member 6 has been shown as of slightly less width than the width of the retaining frame 2, so that its ends normally are slightly out of engagement with the frame. However, the particular advantage of this construction is that it allows of slight expansion of the spring member 6 on pressure against the center of its arch and thus provides greater resilience and yieldability of this member than would be the case were its ends rigidly held and the spring consisting entirely of the buckling of the arch, although it will be understood that desirable results can be accomplished even with the member 6 tightly held at its ends.

In Fig. VII, I have illustrated another form of the invention wherein the bracing member 6 is disposed in a direction opposite to that shown in Fig. III, so that the edges thereof will engage the outer lens 5 while the center of the arcuate portion bears against a supplemental lens 10 arranged within the rear portion of the lens frame and securely retained in position by means of the angular flange 11 which is formed by turning inwardly the edge of the lens frame. Furthermore the outer lens 5 is retained in position in a similar manner, but it will be understood that any suitable form of retaining means may be used to hold the lenses in place within the frame. In this form of the invention the retaining member 6 is somewhat smaller in diameter than the lens frame so as to permit of yielding movement of this member should an object strike the outer lens member 5 and also the inner lens member 10 will provide a further shield for the broken glass, should the outer lens member 5 be broken by an object striking against the same.

I claim:

1. A visual member for an ophthalmic mounting or the like, including an outer transparent frangible member and a rear infrangible member having contact centrally with the frangible member and having its edges curving rearwardly from said member, and means engaging the rear edges of the infrangible member to provide a base for the resilient supporting arch thereof.

2. In a device of the character described, the combination with a frame, of a correction lens loosely mounted within the frame and a retaining device therefor in the form of a resilient arched member centrally engaging the lens and having its terminal portions deflected rearwardly therefrom and engaging the frame to resiliently hold the lens in position therein.

3. In a device of the character described, the combination with a retaining frame, of a lens loosely mounted within the frame and a reinforcing supporting member therefor in the form of a resilient arch of transparent non-frangible material centrally engaging the lens and having its termini rearwardly deflected and engaging the frame to yieldingly hold the lens forward in the frame.

4. In a device of the character described, the combination with a retaining frame, of a lens loosely mounted within the frame and a reinforcing supporting member therefor in the form of a resilient arch of transparent non-frangible material centrally engaging the lens and having its termini rearwardly deflected and engaging the frame to yieldingly hold the lens forward in the frame, said resilient member having the property of selectively eliminating predetermined wave lengths of the spectrum.

5. In a device of the character described, the combination with a retaining frame, of a lens loosely mounted within the frame and a reinforcing supporting member therefor in the form of a resilient arch of transparent non-frangible material centrally engaging the lens and having its termini rearwardly deflected and engaging the frame to yieldingly hold the lens forward in the frame, said member having the rear or exposed face thereof provided with a protecting film to prevent scratching or injury thereof.

6. In a device of the character described, the combination with a frame, of a lens loosely mounted therein and a retaining member for the lens in the form of a resilient non-frangible transparent arched member centrally engaging the lens and having its edges rearwardly deflected and engaging the frame to yieldingly hold the lens forward in the frame, said member having its forward face provided with a transparent film having the property of selectively eliminating heat rays and having its rear face provided with a transparent protecting film.

7. In an eye protector, the combination with a frame, of an arched non-vitreous resilient transparent protecting member mounted therein and having a transparent film formed on each face thereof, said films having the property of selective eliminating predetermined light waves and the films on opposite faces having the property of retardence of different light waves, a lens and means for supporting the lens forwardly of the transparent non-vitreous member.

8. In a device of the character described, the combination with a lens support and a lens mounted therein, of a transparent retaining member for the lens of arcuate form in cross section having its center supported by one of the two first named parts and its ends by the other of said parts to brace the lens within the frame.

9. In an eye protector, the combination with a frame, of a lens loosely mounted within the frame and a bracing member for the lens substantially coextensive therewith, said bracing member being formed from transparent material and arched in cross section, said member contacting with the lens at the one side to hold the same forward in the frame, and means associated with the frame engaging the arched member on the opposite side to retain the parts in position.

10. A device of the character described including a frame and a visual member mounted within the frame and a transparent backing for the visual member formed from relatively infrangible resilient material cupped to arcuate form in cross section, said member being supported by the frame and resiliently retaining and bracing the visual member in position therein.

11. In a device of the character described the combination with a retaining frame, of a lens loosely mounted within the frame and a reinforcing supporting member therefor of transparent non-frangible material, said member having the rear or exposed face thereof provided with a protecting film.

12. In a device of the character described the combination with a frame, of a lens mounted therein and a reinforcing member for the lens of relatively non-frangible material having the property of selective transmission and of selective elimination of certain portions of the spectrum.

13. An eye protector including a frame, a lens mounted within the frame, and a co-extensive yieldable transparent supporting member for retaining the lens in position within the frame.

14. An eye protector including a frame, a lens in the frame, and a yieldable transparent non-vitreous backing member engaging the frame and the lens for retaining the latter in proper position within the frame.

15. An eye protector including a frame, a lens in the frame, a yieldable transparent non-vitreous backing member engaging the frame and the lens for retaining the latter in proper position within the frame, said backing member bearing means having the property of selective elimination of predetermined light waves.

16. A lens for protection purposes comprising a resilient transparent base member bearing a flexible transparent protective coating on one face thereof, said coating having the property of selective elimination of light radiations.

17. A device of the character described including a frame, an impact receiving lens loosely mounted within the frame, and a yielding support for the impact lens in the form of a flexible transparent protection member retaining the lens in position in the frame through its own tension.

18. A device of the character described including a frame, an impact receiving lens loosely mounted within the frame, and a yielding support for the impact lens in the form of a flexible transparent protection member retaining the lens in position in the frame through its own tension, said member being protected from injury by the impact receiving lens and being provided with means for selectively eliminating undesirable radiations.

In testimony whereof I have affixed my signature in presence of two witnesses.

LUCIAN W. BUGBEE.

Witnesses:
  E. S. KOCHERSPERGER,
  H. E. COLEMAN.